US008522659B2

(12) United States Patent
Barandiaran Echeguia

(10) Patent No.: US 8,522,659 B2
(45) Date of Patent: Sep. 3, 2013

(54) AUTOMATIC MACHINE FOR PUNCHING AND CUTTING WHEEL RIMS

(75) Inventor: Juan Ignacio Barandiaran Echeguia, Oiartzun (ES)

(73) Assignee: Eisen XXI, S.L., Oiartzun (Guipuzcoa) (ES)

( * ) Notice: Subject to any disclaimer, the term of this patent is extended or adjusted under 35 U.S.C. 154(b) by 561 days.

(21) Appl. No.: 12/867,350

(22) PCT Filed: Feb. 9, 2009

(86) PCT No.: PCT/ES2009/000071
§ 371 (c)(1),
(2), (4) Date: Sep. 28, 2010

(87) PCT Pub. No.: WO2009/101224
PCT Pub. Date: Aug. 20, 2009

(65) Prior Publication Data
US 2011/0011232 A1  Jan. 20, 2011

(30) Foreign Application Priority Data
Feb. 15, 2008  (ES) .................................. 200800410

(51) Int. Cl.
*B26D 9/00* (2006.01)
(52) U.S. Cl.
USPC ............................... 83/518; 83/639.1; 83/618
(58) Field of Classification Search
USPC .................. 83/618, 513–519, 620, 623, 627, 83/639.1, 522.11, 522.15–522.25, 72, 39, 83/40
See application file for complete search history.

(56) References Cited

U.S. PATENT DOCUMENTS

| 4,250,784 A | | 2/1981 | Bredow |
| 4,664,008 A | | 5/1987 | Friggstad |
| 4,989,483 A | * | 2/1991 | Lacrouts-Cazenave ....... 83/76.9 |
| 5,144,872 A | | 9/1992 | Kakimoto |
| 7,418,773 B2 | * | 9/2008 | Simek ........................... 29/34 R |
| 7,461,579 B2 | * | 12/2008 | Kobayashi ..................... 83/552 |

FOREIGN PATENT DOCUMENTS

| EP | 0 963 802 | 12/1999 |
| EP | 1 245 356 | 10/2002 |
| EP | 1 839 768 | 10/2007 |
| WO | 2007/122294 | 11/2007 |

OTHER PUBLICATIONS

International Search Report issued Jun. 9, 2009 in International (PCT) Application No. PCT/ES2009/000071.

* cited by examiner

*Primary Examiner* — Phong Nguyen
(74) *Attorney, Agent, or Firm* — Wenderoth, Lind & Ponack, L.L.P.

(57) ABSTRACT

Machine for punching holes through a longitudinal sheet or wheel rim passing in a horizontal direction, using punches, and also for cutting said sheet to obtain sheet portions or pieces. The machine is characterized in that the punching and cutting operations are performed by a single power unit, such as an oleohydraulic cylinder (2) secured to a frame and positioned at the top in a vertical direction. The shaft of said cylinder is connected to a cutter-holding carriage (4) which, as it moves downwards to cut the sheet (10), brings with it an upper support means (19) that forms part of a punching device (6), the punches of which are guided on a lower front carriage (8) that also forms part of the punching device (6).

11 Claims, 3 Drawing Sheets

AUTOMATIC MACHINE FOR PUNCHING AND CUTTING WHEEL RIMS

OBJECT OF THE INVENTION

The present invention, as this specification states in its title, relates to an automatic machine for punching and cutting wheel rims, essence of which is focused in that the punching and cutting operations are performed by a single power unit, preferably using an oleohydraulic cylinder, so that during the movement in a direction of its shaft both punching and cutting operations are performed, all this through an automatic process.

This way the machine is kept compact and small in size, what lowers the cost of the mentioned machine and also results in a better utilization of raw material from which the different pieces are obtained.

BACKGROUND OF THE INVENTION

Currently, punching and cutting operations for obtaining pieces are performed through machines that include power units, such as oleohydraulic cylinders. These punching and cutting operations are performed separately, i.e. the punching is performed by a power unit and the cutting by another different power unit.

The inclusion of power units for each operation involves a greater complexity of the machine, as well as larger dimensions, which raise the cost of said machine and also mean a more difficult operation with the inclusion of a larger number of units and pieces.

DESCRIPTION OF THE INVENTION

In order to achieve the objects and avoid the drawbacks mentioned in the preceding paragraphs, the invention proposes an automatic machine for punching and cutting wheel rims characterized in that it includes a single power unit, such as an oleohydraulic cylinder, for example, to perform the punching operation and the cutting operation, so that both are performed during the movement in a direction of the cylinder shaft, said movement being in a downward vertical direction.

The oleohydraulic cylinder acts in turn on a characteristic punching device and a characteristic cutting device both associated with each other, forming all the essence of the machine assembly of the invention.

The machine includes a sturdy frame, at the top of which the oleohydraulic cylinder is secured, a cutter-holding carriage that forms part of the cutting device being vertically guided on such frame, so that as the shaft moves out, it brings with it the cutter-holding carriage for cutting an elongated sheet or wheel rim passing inside a passage opening belonging to a front carriage that forms part of the punching device and which can be moved in a transversal horizontal direction, perpendicular to the longitudinal horizontal direction relating to the movement of the elongated sheet, from which the respective pieces are obtained.

The front carriage is coupled to a lower guide fixed solidly to the frame.

On the other hand, two punch-holders protruding underneath the passage opening are guided vertically in the front carriage. The punches are mounted at the end of the punch-holders, and they have their end cutting portions close to, and facing, the sheet for punching the respective punch holes.

The punch-holders also protrude above the front carriage and have heads for the upwards movement of the punch-holders. These punch-holders are subjected to the push of some springs guided by centered rods. Said centered rods are held from the top to a plate which forms part of an upper support wherein two cylinders are secured in opposition. The shafts of said cylinders are connected to wedges or butts with recesses facing the centered rods. The punches are also coupled in passages of the upper support, which also form integral part of the punching device assembly.

The punching device is also transversally guided by its upper plate on a channeling of the cutter-holding carriage. In this way in a primary downwards movement the cutter-holding carriage moves the upper support of the punching device and with it, one or two punches make the holes on the longitudinal sheet by using the lower cutting ends of the punches.

The activation of the punches will thus depend on the position of the wedges, so that if they are located between the upper base of the punch-holders and the plate of the upper support in correspondence with the rods and springs, the punch will move downwards. Otherwise, the punch will be removed overcoming the push of the spring when coming into contact with the material to be punched and will not make any hole on the sheet. In this case, the punch-holder will slide into the hole of the top of the punching device.

The cut of the longitudinal sheet will be performed at a later phase without stopping the vertical movement of the cutter-holding carriage, thus obtaining a sheet portion with the holes accurately punched using one or two punches.

The punching device could include a single punch, and even more than two if necessary.

The machine includes detection devices (limit switches) to accurately determine the cutter-holder carriage position:
  one position of removed tools in which the cylinder will be in a resting position with its shaft tied-back,
  an intermediate punching position of downwards vertical movement indicating the cut using the punching,
  and a limit switch cutting position of the cylinder shaft wherein the cut of the sheet or wheel rim is performed.

The longitudinal sheet rests on a series of idler rollers, while is being dragged by using friction rollers driven by servo motor, and accurately measured by using an encoder.

Next, to facilitate a better understanding of this specification and forming an integral part thereof, some figures in which the object of the invention has been represented in an illustrative and not limitative manner, are attached.

DESCRIPTION OF THE PREFERRED EMBODIMENT

Figure 1:
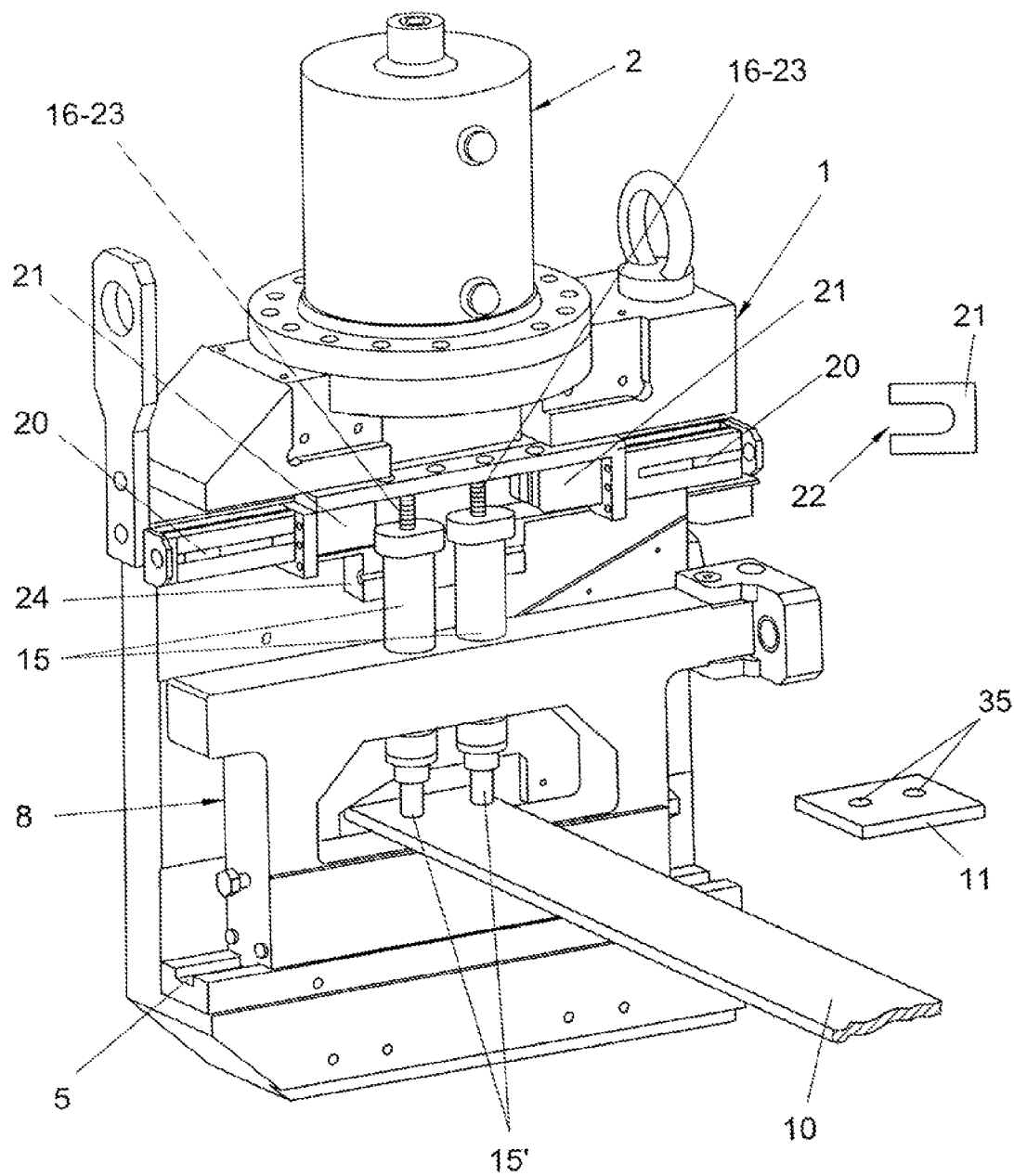
FIG. 1 shows a perspective view of an automatic machine for punching and cutting wheel rims object of the invention. It basically comprises a punching device, a cutting device essentially defined by a cutter-holding carriage, both devices being associated with each other and which are activated by using a single power unit during the movement in a direction of such power unit, such as the shaft of an oleohydraulic cylinder.
Figure 2:
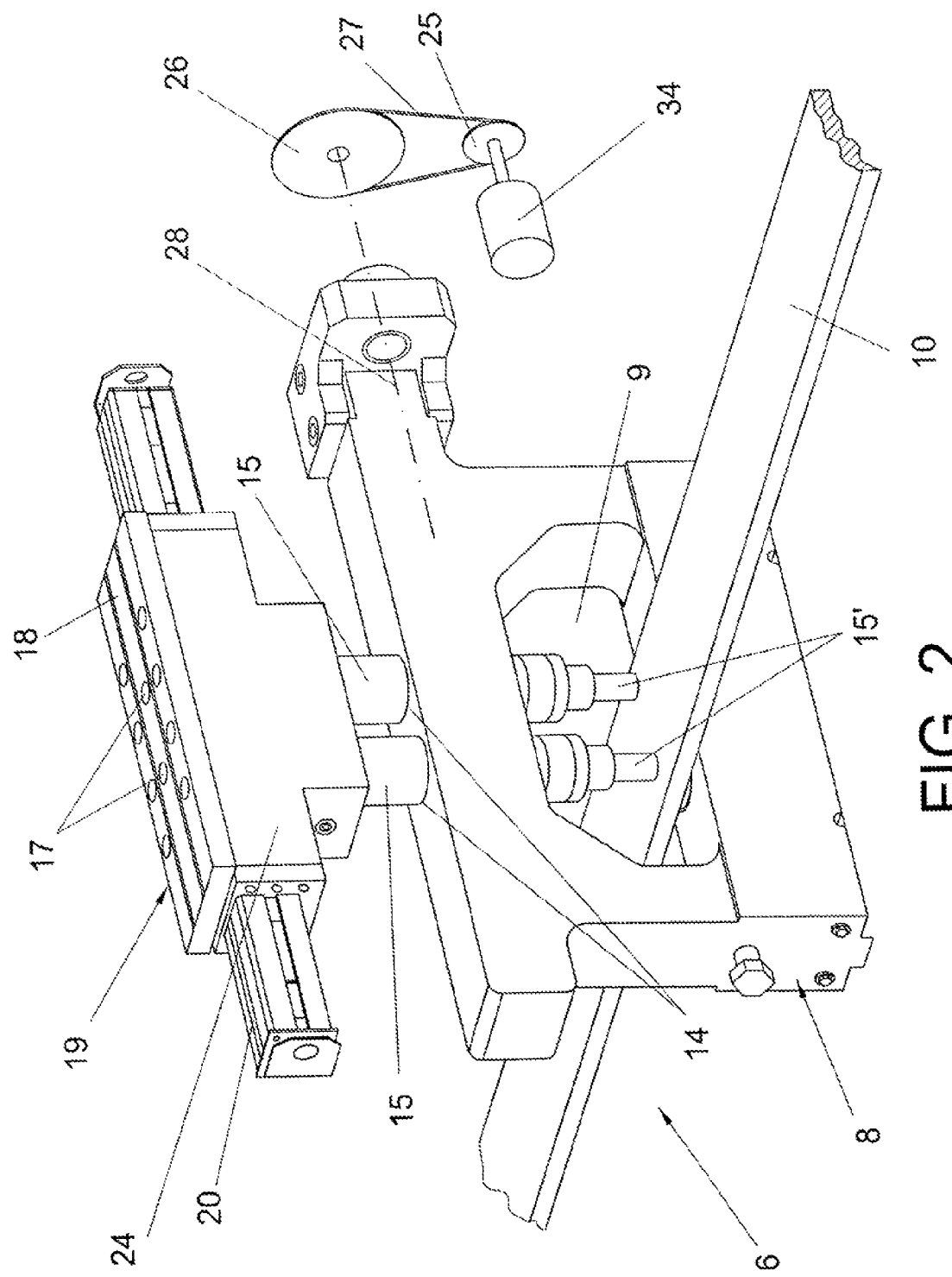
FIG. 2 shows a perspective view wherein the punching device assembly is shown.
Figure 3:
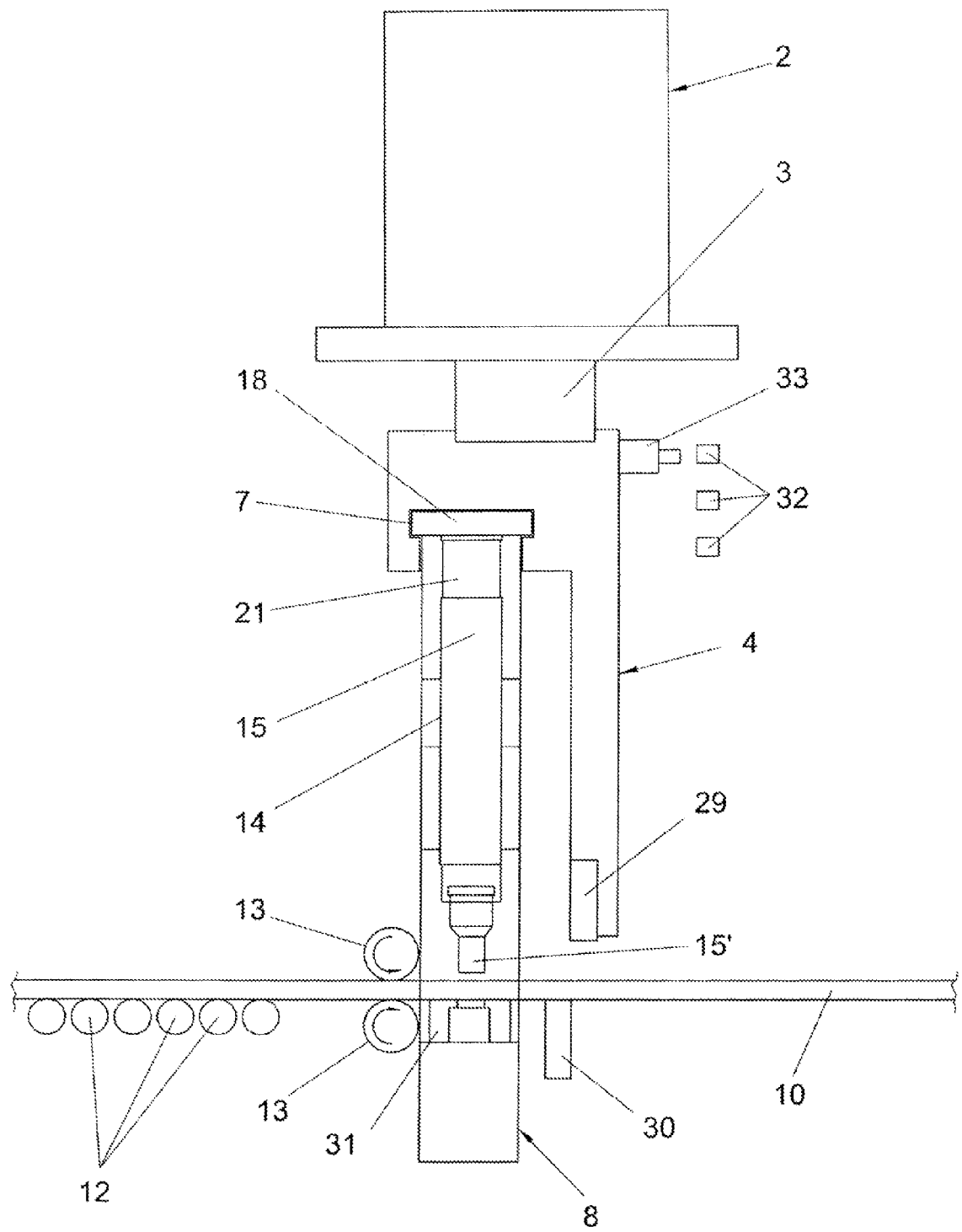
FIG. 3 shows a side view of the machine of the invention.

By considering the numbering adopted in the figures, the automatic machine for punching and cutting wheel rims is defined from a frame 1, at the top of which an oleohydraulic cylinder 2 with vertical movement of its shaft 3 is secured. Said cylinder is connected to a cutter-holding carriage 4 which is also obviously moved in the vertical direction, while it is guided on the mentioned frame 1.

This frame 1 has at its bottom a transversal guide 5 in an horizontal direction on which a punching device 6 is downwardly coupled. The frame is also coupled in another upper transversal guide 7 established in the cutter-holding carriage 4.

The punching device 6 comprises a front carriage 8 that has a passage opening 9 through which a longitudinal sheet or wheel rim 10 passes, from which the different sheet portions or pieces 11 will be obtained.

This sheet 10 follows an horizontal and longitudinal direction supported on a series of rollers 12 and being dragged by using a pair of opposing friction rollers 13 actuated by driving a servo motor (not shown in the figures) and position of which is controlled using an encoder (not shown in the figures) for accurately cutting and punching different portions of sheet 11.

The front carriage 8 has two through holes 14 wherein two vertical punch-holders 15 are fitted. Said punch-holders protrude through the passage opening 9. On the end of the punch-holders, punches 15' are mounted to punching the longitudinal sheet 10. The punch-holders 15 also extend upwards ending in flat bases in which centers some springs guided by concentric rods 16. Said concentric rods are fixed in the bores 17 in the upper plate 18. The upper plate forms part of an upper support means 19 that integrate two cylinders 20 placed in the opposite direction. The shafts of the cylinders 20 are connected to cubic wedges or butts 21 in order to locate them between the mentioned plate 18 and the bases of the punch-holders 15.

The butts 21 have recesses 22 to save the rods 16 and springs 23 coaxially arranged around those rods 16.

The punch-holders 15 are also fitted in a central part 24 of the upper support means 19 also integrated in the punching device 6.

The punching device 6 assembly is moved in a transversal direction in order to be able to place the punch-holders 15 in the accurate vertical direction using a servo motor 34. Said servo motor acts on a pair of pulleys 25 and 26 associated through a belt 27, so that the farthest pulley is connected to a spindle 28 linked to such front carriage 8.

The cutter-holding carriage 4 includes an upper cutter 29 complemented with another lower cutter 30 attached to the body 1, located below the sheet 10, the cut being performed by shearing as that cutter-holding carriage 4 moves downwards.

In turn, there are matrixes 31 mounted on the carriage 8 below the sheet 10, said matrixes face the cutting lower end portion of the punches 15' and they are intended to punch holes 35 on the sheet when said sheet moves one or two punches downwards with the punch-holders 15, depending on the position of the wedges or butts 21. The butts are facing the upper bases of the punch-holders 15, so that the punch-holders will move downwards for making the bores 35.

In contrast, if the butts 21 do not face the punch-holders 15, these will be removed in contact with the sheet. In this case the springs will be compressed guided by the rods.

There are at least three control positions of the oleohydraulic cylinder 2 controlled by three detection devices or limit switches 32 secured to the frame 1 and associated with a piece 33, said piece 33 being solidly fixed to the cutter-holding carriage 4.

A position corresponding to the resting cylinder located in a lifted position, another intermediate corresponding to the punching position, and a third one corresponding to the cutting position of the sheet 10, this position is one wherein the shaft 3 performs the maximum stroke.

The invention claimed is:

1. AN AUTOMATIC MACHINE FOR PUNCHING AND CUTTING WHEEL RIMS, which is used for punching holes through a longitudinal sheet or wheel rim (10) that passes in a horizontal direction, using punches, and is also used for cutting said longitudinal sheet or wheel rim into small pieces, using a cutter, the machine comprising:
a frame (1) having a transversal lower guide (5);
independent movable butts (21);
a cutter-holding carriage (4) having an upper guide (7);
a punching device (6) having an upper support (19), a lower front carriage (8), punch-holders (15) and punches (15') extending from the punch-holders (15), wherein the upper support (19) is coupled to the upper guide (7), wherein the lower carriage (8) is coupled to the transversal lower guide (5), and wherein the punch-holders (15) are guided on the lower front carriage (8) and coupled to the upper support (19);
an oleohydraulic cylinder (2) having a shaft (3), wherein the oleohydraulic cylinder is positioned at a top of the frame (1) in a vertical direction, and the shaft (3) is connected to the cutter-holding carriage (4);
wherein the punching and cutting operations are powered by a single oleohydraulic cylinder;
wherein the downward movement of the shaft (3) causes the movement of the cutter-holding carriage (4) and the upper support (19) towards the sheet (10) to punch holes in the sheet (10) and then cut the sheet (10) into small pieces;
wherein the movement of the punch-holders (15) and punches (15') during the simultaneous downwards movement of the cutter-holding carriage (4) and of the upper support (19), depend on positions of the independent movable butts (21) which if the independent movable butts (21) are located between upper end bases of the punch-holders (15) and a plate (18) of the support (19), a completely downward movement of the punches (15') will be allowed so that the punches (15') punch holes in the sheet (10), whereas if such independent moveable butts (21) are not located between the upper end bases of the punch-holders (15) and the plate (18) of the upper support (19), the completely downward movement of the punches (15') to punch holes will not be allowed because when the punches (15') contact the sheet (10), the sheet (10) stops the downward movement of the punches (15') while still allowing the downward movement of the cutter-holding carriage (4) and the upper support (19).

2. THE AUTOMATIC MACHINE FOR PUNCHING AND CUTTING WHEEL RIMS, according to claim 1, wherein the punch-holders being fitted in a centered part (24) of the upper support (19).

3. THE AUTOMATIC MACHINE FOR PUNCHING AND CUTTING WHEEL RIMS, according to claim 1, wherein a transversal movement of the punching device (6) is performed using a spindle (28) associated with the front carriage (8) and connected to a servo-motor (34).

4. THE AUTOMATIC MACHINE FOR PUNCHING AND CUTTING WHEEL RIMS, according to claim 3, wherein the butts (21) are connected to two opposing cylinders (20) which are joined to the upper support (19).

5. THE AUTOMATIC MACHINE FOR PUNCHING AND CUTTING WHEEL RIMS, according to claim 4, wherein on the upper end bases of the punch-holders (15) coaxial springs (23) are arranged around rods (16), said rods

(16) extend upwardly from the upper bases of the punch-holder (15), said rods (16) are held in bores (17) in the plate (18) of the upper support (19), wherein when the upper support (19) moves downwards and the butts (21) do not face with the upper end bases of the punch-holder (15), the rods (16) are pushed into the bores (17) when the punches (15') contact the sheet (10), and the upper support (19) is urged against the springs (23).

6. THE AUTOMATIC MACHINE FOR PUNCHING AND CUTTING WHEEL RIMS, according to claim 5, wherein the butts (21) have recesses (22) facing with the rods (16) and springs (23) for receiving them when the butts (21) face the upper end bases of the punch-holders (15).

7. THE AUTOMATIC MACHINE FOR PUNCHING AND CUTTING WHEEL RIMS, according to claim 3, wherein the upper support (19) of the punching device (6) is guided on the transversal direction in the cutter-holding carriage (4) using its upper plate (18).

8. THE AUTOMATIC MACHINE FOR PUNCHING AND CUTTING WHEEL RIMS, according to claim 1, wherein the front carriage (8) has a passage opening (9) through which the longitudinal sheet (10) passes and wherein lower sections of the punch-holders (15) protrude, the punches (15') are mounted on lower ends of the lower sections of the punch-holders (15) and cutting ends of the punches face with matrixes (31) which are secured to a lower part of the front carriage (8).

9. THE AUTOMATIC MACHINE FOR PUNCHING AND CUTTING WHEEL RIMS, according to claim 8, wherein the butts (21) are connected to two opposing cylinders (20) which are joined to the upper support (19).

10. THE AUTOMATIC MACHINE FOR PUNCHING AND CUTTING WHEEL RIMS, according to claim 1, further comprising three detection device for controlling movement positions of the shaft (3), wherein a first position corresponds to the cylinder (3) resting in a lifted position, a second position corresponds to a punching position, and a third position corresponds to a cutting position, wherein in the third position, the shaft (3) performs a maximum stroke.

11. THE AUTOMATIC MACHINE FOR PUNCHING AND CUTTING WHEEL RIMS, according to claim 1, wherein the longitudinal sheet (10) is dragged in a controlled and accurate manner using a pair of friction rollers (13) actuated by a servo motor.

* * * * *